United States Patent [19]

Evequoz

[11] 3,870,329
[45] Mar. 11, 1975

[54] SKI-BOB

[76] Inventor: Jean-Yves Evequoz, 17, route de la Dixence, 1950 Sion, Switzerland

[22] Filed: Oct. 12, 1973

[21] Appl. No.: 405,849

[30] Foreign Application Priority Data
Oct. 14, 1972 Switzerland.................. 15053/72
July 31, 1973 Switzerland.................. 11111/73

[52] U.S. Cl..................................... 280/16, 280/25
[51] Int. Cl........................................... B62b 13/04
[58] Field of Search................. 280/16, 25, 21 R, 26

[56] References Cited
UNITED STATES PATENTS
3,588,138  6/1971  Cerny ................................. 280/16
3,656,775  4/1972  Krautter .............................. 280/16
3,771,807  11/1973  Porsche .............................. 280/16

Primary Examiner—Robert R. Song
Attorney, Agent, or Firm—Bacon & Thomas

[57] ABSTRACT

The chassis of a ski-bob with a steerable front ski and a pair of rear skis has a pair of longitudinal frame members independently pivotally mounted on the chassis, each rear ski being connected to a frame member by an independent suspension device. These frame members serve as foot-rests or as platforms for the rider's feet.

8 Claims, 5 Drawing Figures

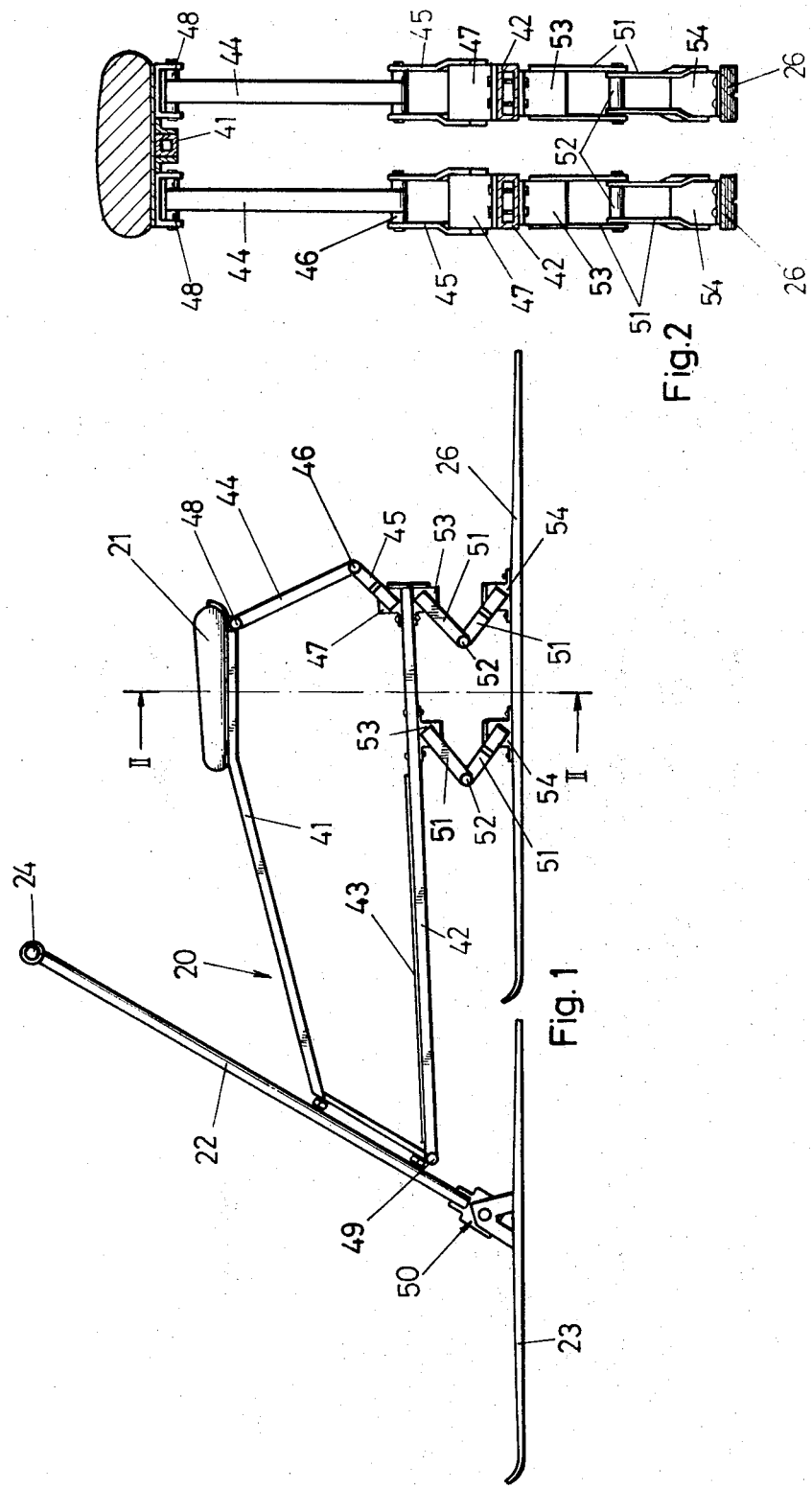

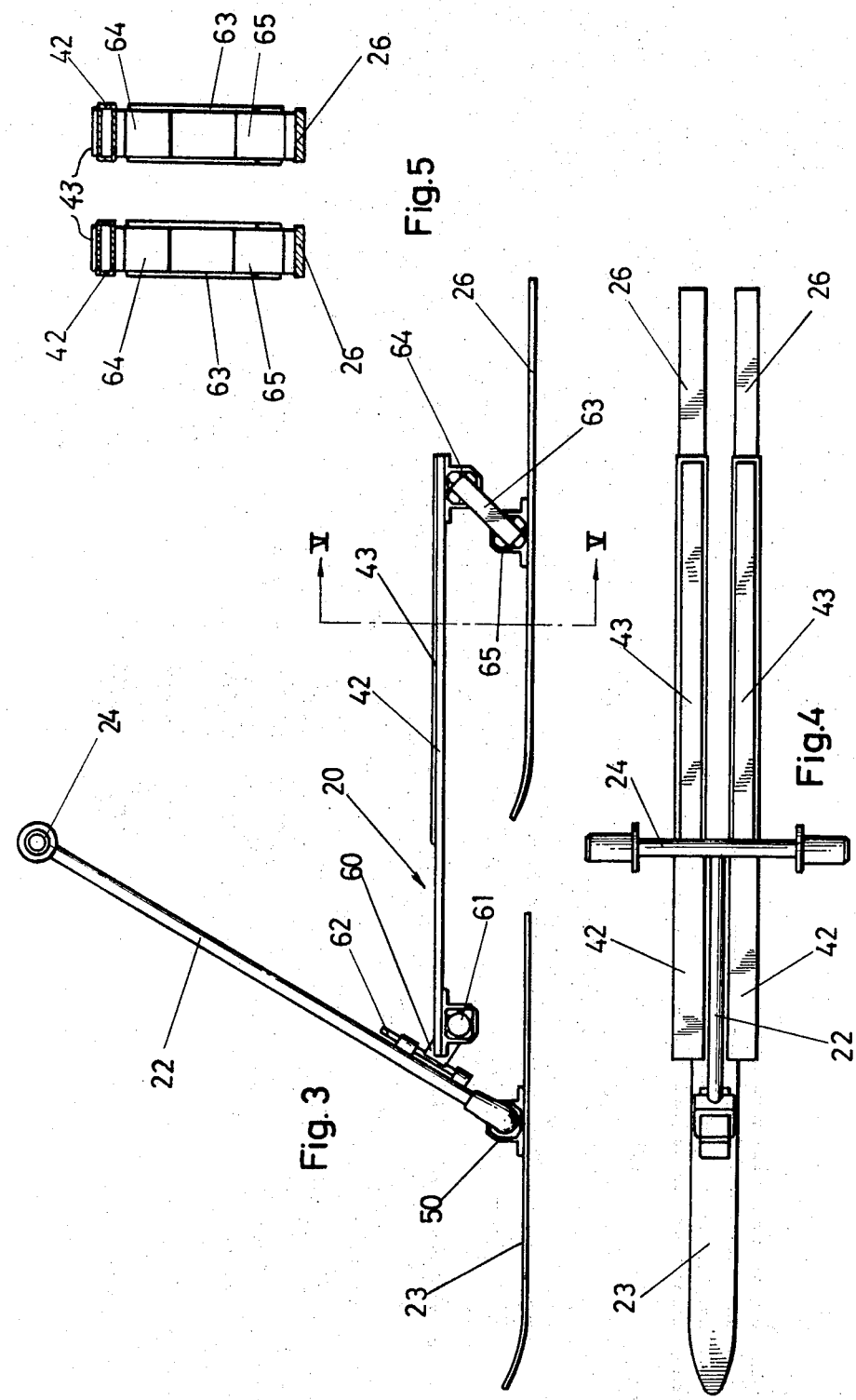

SKI-BOB

The invention relates to ski-bobs, sometimes called "ski-cycles".

A known type of ski-bob includes two rear skis independently connected to a chassis by two separate suspension devices, for example including torsion-operating shock absorbers.

An object of the invention is to provide an improved ski-bob of the above-defined type.

Another object of the invention is to enable the rider of a ski-bob of the above-defined type to selectively apply foot pressure to the rear skis and thereby facilitate steering of the ski-bob, without a need for the rider to wear separate short skis on his feet.

A subsidiary object of the invention is to provide a ski-bob of the above type with a simplified construction, and with the novel feature that in use the rider stands on the bob chassis, rather than sitting on a seat as in known constructions.

In general terms, according to the invention a ski-bob of the above-defined type is characterized by the fact that the two suspension devices are associated with respective ones of a pair of independently-connected frame members of the chassis.

In more specific terms, the invention provides, in a ski-bob comprising a chassis, a steering column pivotally connected to the chassis about a first axis, a front ski connected to the steering column, and a pair of rear skis connected to the steering column, and a pair of rear skis connected to the chassis by two independent suspension devices, the improvement wherein the chassis includes a first part to which the steering column is connected and a pair of independent elongate frame members each having a first end and a second end. Said frame members are independently articulated about said first ends thereof to said first part for independent pivotal movement thereof in generally side-by-side spaced-apart relation about a second axis transverse to said first axis and transverse to the general longitudinal direction of said frame members, and each of said suspension devices is independently connected to a respective one of said frame members towards the second end thereof.

Two embodiments of the invention will now be described, by way of example, with reference to the accompanying schematic drawings, in which:

FIG. 1 is a side elevational view of a first embodiment of ski-bob;

FIG. 2 is an enlarged-scale cross-sectional view taken along line II—II of FIG. 1;

FIG. 3 is a side elevational view of a second embodiment of ski-bob;

FIG. 4 is a top plan view of the second embodiment; and

FIG. 5 is an enlarged-scale cross-section taken along line V—V of FIG. 3.

The ski-bob shown in FIGS. 1 and 2 includes a chassis 20, a seat 21, a steering column 22, a steerable front ski 23, a handle-bar 24 and a pair of rear skis 26.

The front ski 23 is pivotally connected to the lower end of steering column 22 by a torsion-operating shock absorber 50.

The chassis 20 forms a frame, partly provided as a single element, partly as twin or double elements. The single part of the frame is formed by a rigid tube 41 of square cross-section, bent into three sections: a head tube on which steering column 22 is mounted by means defining its pivoting axis parallel to this head tube, an intermediate part or cross-bar, and a rear part on which seat 21 is fixed.

The twin or double part of the frame includes two rectilinear tubes 42 of rectangular cross-section freely pivoted to the lower end of the head tube about a transverse pin 49. The rear ends of tubes 42 are each connected to the underside of seat 21 by a respective suspension device, each of these devices comprising a rod 44 pivotally connected to a transverse pin under seat 21, and a pair of arms 45 pivotally connected at one end thereof to the free end of rod 44 about a transverse pin 46 and at the other end thereof to tube 42 by means of a torsion-operating shock absorber 47, also having a transverse pivoting axis.

The rear skis 26 are connected to tubes 42 of chassis 20 by means of two distinct suspension devices each including two pairs of linkage members 51 pivotally connected together about a transverse shaft 52 to form a toggle, each upper member 51 being connected to tube 42 by a torsion-operating shock absorber 53 and each lower member 51 being connected to the respective ski 26 by another torsion-operating shock absorber 54.

The flat upper faces of tubes 42 carry plates 43 of a non-slip matrial forming rests for the riders' feet.

In use, the described ski-bob not only has the advantage of providing a very smooth ride over an uneven track, but the rider can also achieve accurate steering by selectively pressing his feet on the rests 43, and hence on rear skis 26, in conjunction with the steering action provided for by the handle bar 24. The use of separate small skis carried on the riders feet, as are employed with most prior types of ski-bob to aid steering, is therefore not necessary.

The ski-bob shown in FIGS. 3–5 includes a chassis 20, a steering column 22, a steerable front ski 23 pivotally connected to the lower end of column 22 by means of a torsion-operating shock absorber, a handle-bar 24 and two rear skis 26.

Chassis 20 includes a plate 60, and a pair of rectilinear tubes 42 of rectangular cross-section independently pivotally connected at the front ends thereof to plate 60 by means of two torsion-operating shock absorbers 61. Column 22 is hinged to plate 60 by a shaft 62 carried by the latter.

The rear skis 26 are connected to the chassis by two independent suspension devices each including a linkage member 63 formed by a pair of side plates the upper ends of which are pivotally connected to a torsion-operating shock absorber 64 mounted on the underside of the rear end of a tube 42, and the lower ends of which are pivotally connected to a torsion-operating shock absorber 65 mounted mid-way along the upper face of a ski 26.

The middle and rear parts of the upper faces of tubes 42 carry plates 43 of a non-slip material forming platforms for the rider's feet.

In use, the rider stands on plates 43 and aids or replaces the steering action of handle-bar 24 by selectively applying his weight on the plates 43 and hence on the rear skis 26, i.e., similar to a conventional skiing technique, and notably taking advantage of the ski edges when the ski-bob leans over.

The advantages of this latter ski-bob are its light weight, great flexibility, exceptional handling characteristics, and a relatively low manufacturing cost.

What is claimed is:

1. In a ski-bob comprising a chassis, a steering column pivotally connected to the chassis about a first axis, a front ski connected to the steering column, and a pair of rear skis connected to the chassis by two independent suspension devices, the improvement wherein the chassis includes a first part to which the steering column is connected and a pair of independent elongate frame members each having a first end and a second end, said frame members being independently articulated about said first ends thereof to said first part for independent pivotal movement thereof in generally side-by-side spaced-apart relation about a second axis transverse to said first axis and transverse to the general longitudinal direction of said frame members, and wherein each of said suspension devices is independently connected to a respective one of said frame members towards the second end thereof.

2. A ski-bob according to claim 1, in which said chassis further comprises a second part connected to said first part, a seat on said second part, and two further suspension devices connecting said second parts independently to respective ones of said frame members towards the second ends thereof.

3. A ski-bob according to claim 2, in which said further suspension devices are each connected to the respective frame member by a torsion-operating shock-absorber.

4. A ski-bob according to claim 3, in which said first and second parts of the chassis are rigidly connected to one another, said frame members are freely pivotally mounted to said first part, and said suspension devices connecting the rear skis to the frame members each include two torsion-operating shock-absorbers.

5. A ski-bob according to claim 2, in which said frame members each includes means forming a foot-rest.

6. A ski-bob according to claim 1, in which said frame members are articulated at said first ends thereof to said first part by two independent torsion-operating shock absorbers.

7. A ski-bob according to claim 1, in which said suspension devices each include an elongate linkage member having a first end and a second end, a first torsion-operating shock absorber articulating the first end of the linkage member to the second end of a frame member, and a second torsion operating shock absorber articulating the second end of the linkage member to a rear ski, said first and second shock absorbers having axes parallel to said second axis.

8. A ski-bob according to claim 1, in which said suspension devices each include an elongate linkage member having a first end and a second end, a first torsion-operating shock absorber articulating the first end of the linkage member to the second end of a frame member, a second torsion operating shock absorber articulating the second end of the linkage member to a rear ski, said first and second shock absorbers having axes parallel to said second axis, said frame members being articulated at said first ends thereof to said first part by two independent third torsion-operating shock absorbers, and said frame members having generally flat upper surfaces forming two platforms for a rider's feet.

* * * * *